Patented Feb. 18, 1941

2,232,305

UNITED STATES PATENT OFFICE 2,232,305

INTERNAL COMBUSTION ENGINE

Harding Ferris Bakewell, San Marino, Calif.

Application December 8, 1938, Serial No. 244,673

13 Claims. (Cl. 123—54)

The object of my invention is to provide an internal combustion engine, particularly for use in aircraft or the like, which can produce a balanced power output and is provided with simple means for vaporizing the lower grades of liquid fuel and mixing same proportionately with an incoming charge of air.

A further object of my invention is to so arrange the firing order of a multi-cylinder engine, in such manner that a certain group of cylinders have a co-ordinated period of intake of air and gas mixture permitting the formation of said air and gas mixture for said group of cylinders as a periodic cyclical function.

A further object is to provide an internal combustion engine with cylinder groups so situated and actuated, that said formation of air and gas mixture can be effected in the nearest proximity to the heated cylinders in order to absorb radiated heat units effectively during said formation of air and gas mixture and providing thereby a more complete vaporization of the fuel.

These and other objects, which will be more specifically referred to in the description and claims, are attained by the devices illustrated in the drawings, in which:

Figure 1:
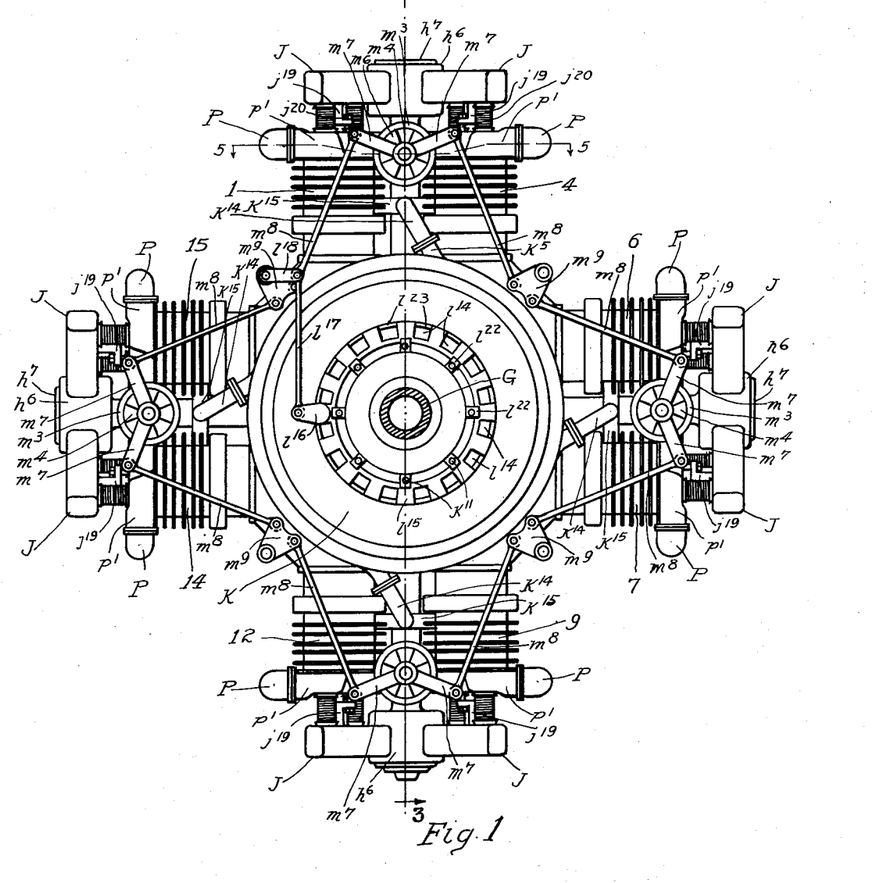
Fig. 1 shows a front elevation of an internal combustion engine embodying my invention.
Figure 2:
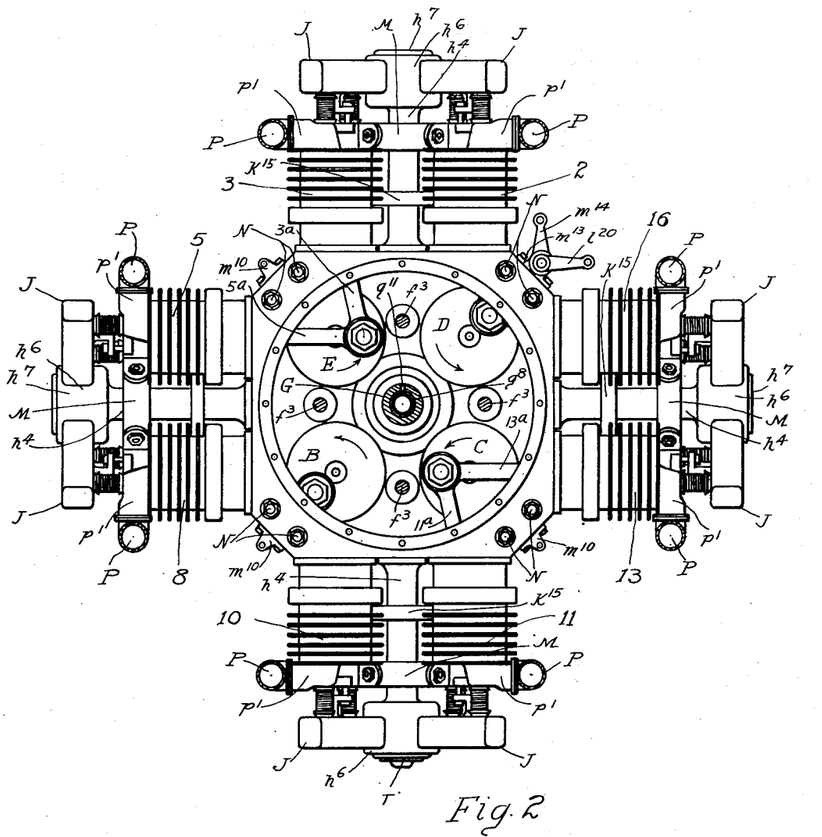
Fig. 2 shows a rear elevation thereof.
Figure 11:
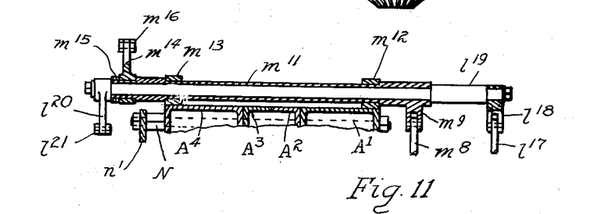
Fig. 11 shows a detail view of operating parts of the control mechanism of the engine.

Referring to Figures 1 and 2 which show the front and rear elevation of a double bank multicylinder engine in which the cylinders are especially grouped to attain functions of operation that are new and novel. Cylinders numbered 1 to 16, in accordance with their respective firing order, are suitably secured to a central body A which comprises the front cylinder housing A1, the front gear housing A2, the rear gear housing A3, and the rear cylinder housing A4, and are suitably connected together by means of the through bolts N, which are suitable means, exterior to the housing A, for attachment to a mounting ring $n1$ as is shown in Figure 11.

The cylinders 1 to 16 are suitably arranged in groups of four, each group arranged to obtain a successive firing order.

A plurality of crankshaft units B, C, D and E are suitably mounted rotatably in the gear housings A2 and A3 in the ball bearings A5 and A6.

Figures 7, 8:
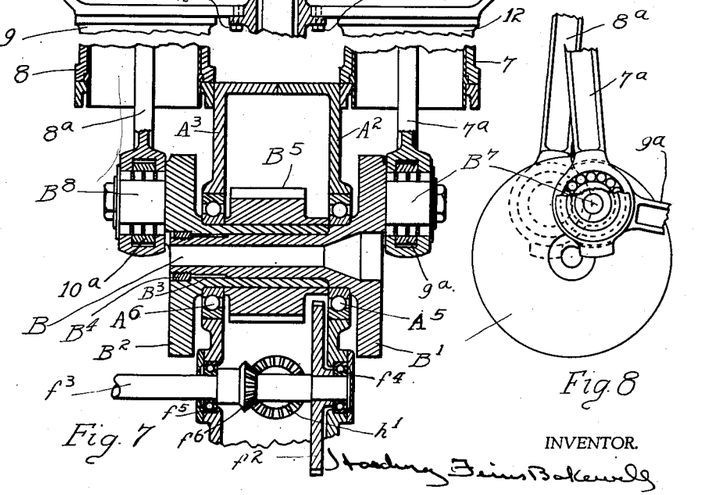
Fig. 7 shows a section on line 7—7 of Figure 6.
Fig. 8 shows a separate detail of a crankshaft and attached connecting rods.

The crankshaft unit B shown in detail in Figure 7, comprises a front crank B1 and a rear crank B2 which are secured to each other by means of a spline B3 and a nut B4 and a pinion B5 is suitably secured between the ball bearings A5 and A6 to the front crank B1 by means of the spline B6. Crank pins B7 and B8 are suitably provided on the front crank B1 and rear crank B2 respectively.

On the crank pin B7 are rotatably mounted a pair of connecting rods $7a$ and $9a$ while on the crank pin B8 are rotatably mounted the connecting rods $8a$ and $10a$.

The crank pins B7 and B8 have a radial divergence of 45 degrees between them on the crank unit B and is thereby adapted to provide the desired interconnecting firing order. The crank units C, D and E are similarly arranged as the crank unit B and the respective prefix and numerals designate similar parts.

The pinions B5, C5, D5 and E5 are suitably meshed to a central gear F which is mounted on the propeller shaft G and secured thereto by the splines G1.

A pinion $f1$ is similarly secured to the propeller shaft G adjacent to the central gear F, and meshes with a plurality of drive gears $f2$ which are suitably mounted on and secured to a plurality of secondary shafts $f3$ which are rotatably mounted in the bearings $f4$ and $f5$ which are provided in the gear housings A2 and A3.

The shafts $f3$ have mounted on and secured thereto a bevel pinion $f6$ which is adapted to drive a bevel gear $h1$ which is secured to a radially extending master shaft H which is rotatably mounted in bearings $h2$ and $h3$ which are suitably mounted in the tube $h4$ which is secured to the gear housings A2 and A3 by the bolts $h5$.

The outwardly extending end of the tube $h4$ is provided with a gear chamber $h6$ and which has suitably secured thereto the cover plate $h7$.

The gear chamber $h6$ is suitably provided with a plurality of openings $h8$ into which a plurality of camshaft tubes $J$ extend.

Each camshaft tube $J$ has rotatably mounted therein a camshaft $j1$ which rotates in the bearings $j2$ and $j3$ which are suitably secured in the camshaft tube $J$.

The camshafts $j1$ extend into the gear chamber $h6$ and have secured thereon the bevel pinions $j4$ which are adapted to mesh with a bevel gear $h9$ which is secured to the mastershaft $H$ within the gear chamber $h6$.

The propeller shaft $G$ is rotatably mounted in the central bearing $g2$, the rear end bearing $g3$ and the front end bearing $g4$ and has secured thereto a propeller $g5$.

A multi-stage supercharger $K$ comprises the end plate $K1$ which is secured to the front cylinder housing $A1$ by means of the screws $K2$ and has secured thereto, by means of the screws $K3$ the final stage housing $K4$, from which extend a plurality of discharge tubes $K5$.

An intermediate stage housing $K6$ is suitably secured to the final stage housing $K4$ by means of the screws $K7$, and to this is secured the first stage housing $K8$ by means of the screws $K9$. A bearing housing $K10$ is secured to the first stage housing $K8$ by means of the screws $K11$ and has secured therein the front end bearing $g4$ in which the propeller shaft $G$ rotates.

An internal gear $L$ is suitably secured to the propeller shaft $G$ within the front cylinder housing $A1$ and meshes with the intermediate pinions $L1$ which are rotatably mounted on the stud pins $L2$ which are secured to the end plate $K1$.

A gear ring $L3$ formed on the impeller tube $L4$ meshes rotatably with the intermediate pinions and is thereby rotated in the opposite direction to the propeller shaft $G$ and at higher speed.

The impeller tube $L4$ is rotatably mounted in the bearing $L5$ which is secured to the end plate $K1$ and in the bearing $L6$ which is secured to support frame $K12$ formed on the first stage housing $K8$.

An impeller frame $L7$ is suitably secured to the impeller tube $L4$ between the bearings $L5$ and $L6$ and has formed thereon an axially extending ring $L8$ to which is secured an impeller $L9$ which is adapted to rotate freely in the final stage housing $K4$.

An intermediate impeller $L10$ is suitably secured to the impeller frame $L7$ by means of the screws $L11$ and the axial extending ring $L12$ which clamp said intermediate impeller $L10$ in free rotating position in the intermediate stage housing $K6$.

A first stage impeller $L13$ is suitably secured to the axial extending ring $L12$ and is adapted to rotate freely in the first stage housing $K8$.

The first stage housing $K8$ is provided with suitable air inlet passages $L14$ over which extends the control gate ring $L15$ which is rotatably mounted on the lugs $L22$ which are secured to the bearing housing $K10$ by means of the screws $K11$.

The control gate ring $L15$ is suitably formed with port openings $L23$ which match the inlet passages $L14$ and is adapted to cover and uncover same when rotated into various positions.

Air may enter the inlet passage $L14$ when the impeller tube is rotated and the control gate ring $L15$ is in open position to said inlet passage $L14$ and will enter the first stage impeller $L13$ and by its rotation and the centrifugal action created thereby, be ejected into the first stage housing $K8$ and through the connecting passages $K12$ formed on the intermediate stage housing $K6$ and into the intermediate stage impeller which eject said air into the intermediate stage housing $K6$ from which said air passes through the connecting passages $K13$ which are formed on the final stage housing $K4$ and through the final stage impeller $L9$ into the final stage housing $K4$ from which said air passes through the discharge tubes $K5$ into the connecting elbows $K14$ which are secured thereto and to a supercharge supply ring $K15$ which surrounds the tube $h4$ and is suitably connected to a group of four cylinders.

Figure 9:
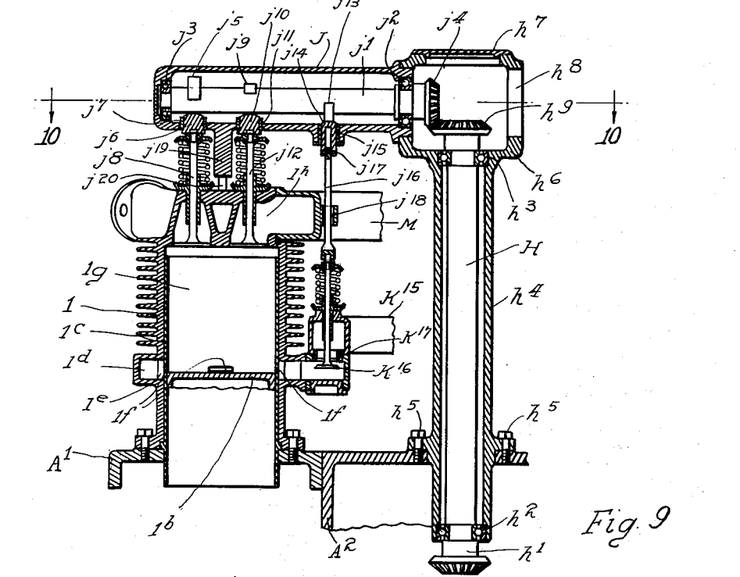
Fig. 9 shows a sectional view of a cylinder and operating mechanism taken on line 9—9 of Figure 5.
Figure 10:
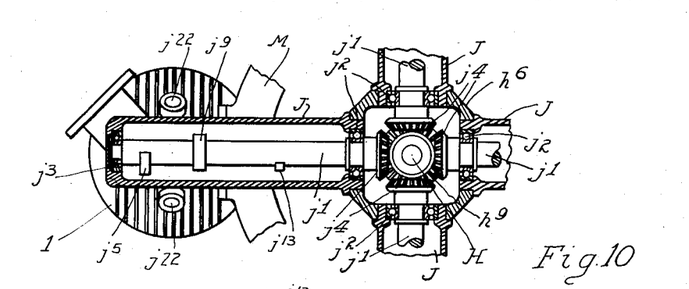
Fig. 10 shows a plan section taken on line 10—10 of Figure 9.

Referring to Figure 9 and Figure 10, the camshaft $j1$ is suitably provided with a cam $j5$ which is adapted to reciprocate a valve plug $j6$ which is slideably mounted in the bushing $j7$ which is secured to the camshaft tube $J$. The valve plug $j6$ is adapted to operate the exhaust valve $j8$ in suitable timed relation to the reciprocation of the piston $1b$ which is slideably mounted within the cylinder liner $1c$ which forms the inner surface of the cylinder $1$.

The cylinder $1$ has formed thereon a circular chamber $1d$ from which suitable ports $1e$ extend to the cylinder liner $1c$.

Suitable openings $1f$ in the cylinder liner $1c$ provide an air passage from the ports $1e$ to the cylinder displacement space $1g$ and these are suitable located in proximity to the piston $1b$ when same is near the end of the intake stroke.

A valve $K16$ is suitably mounted in the valve seat $K17$ which is secured to the supercharger air supply ring $K15$ at the point where same is connected to the circular chamber $1d$ and said valve $K16$, when opened from the valve seat $K17$, provides a passage for air to flow from the supercharger ring $K15$ into said circular chamber $1d$, and through the ports $1e$ and the openings $1f$ into the cylinder displacement space $1g$.

A cam $j9$ suitably formed on the camshaft $j1$ provides means for operating the valve plug $j10$ which is slideably mounted in the bushing $j11$ which is secured to the camshaft tube $J$. The valve plug $j10$ is suitably adapted to operate the intake valve $j12$ in timed relation to the reciprocation of the piston $1b$.

A cam $j13$ suitably formed on camshaft $j1$ is adapted to reciprocate the rod plug $j14$ which is slideably mounted in the bushing $j15$ which is secured to the camshaft tube $J$. A push rod $j16$ which is connected to the rod plug $j14$ by the pin $j17$ extends through a bearing $j18$, formed on the air intake chamber $M$ which is suitably secured to the cylinders, and is adapted to reciprocate the valve $K16$ in timed relation to the reciprocations of the piston $1b$.

Figure 5:
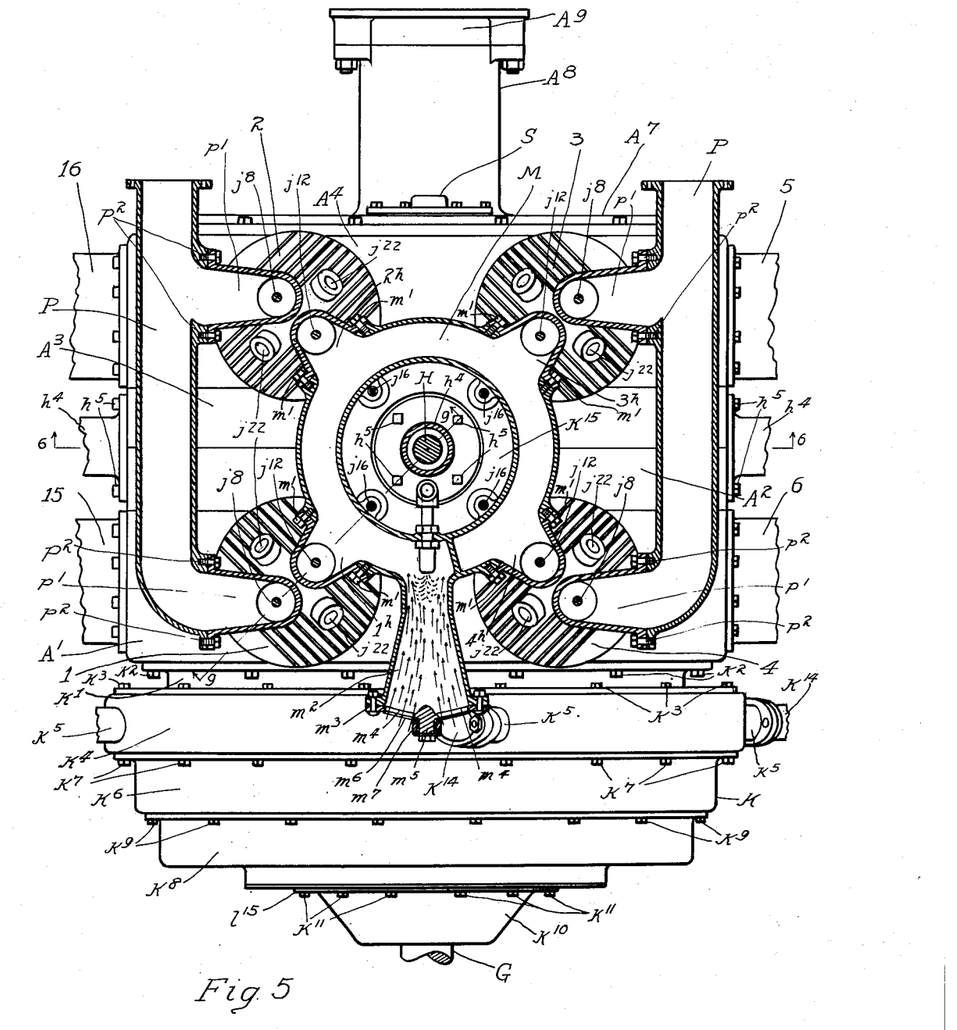
Fig. 5 shows an enlarged section on line 5—5 of Figure 1.
Figure 6:
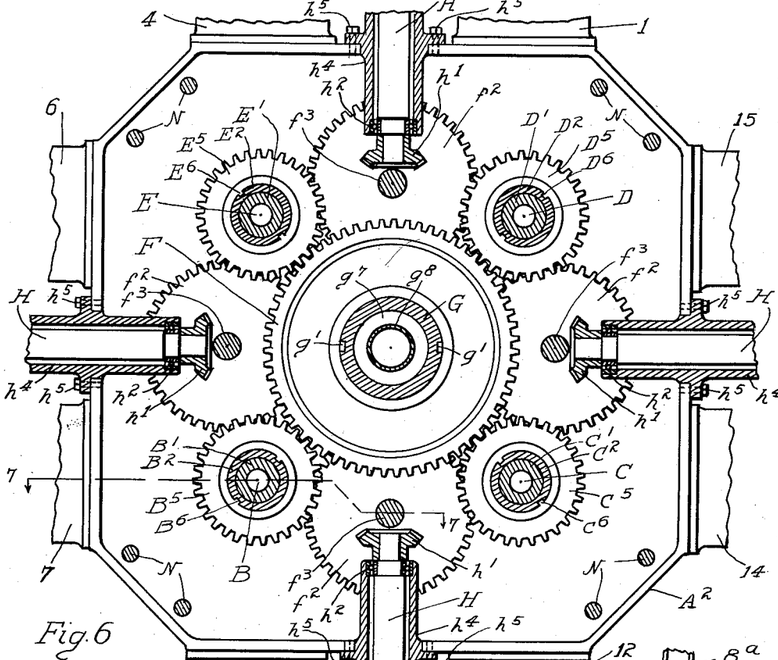
Fig. 6 shows a section on line 6—6 of Figure 5.

As shown in Figure 5 and Figure 9 the air intake chamber $M$ is connected to the cylinder intake ports $1h$, $2h$, $3h$ and $4h$ by the bolts $M1$ and is provided with an air intake nozzle $m2$ to which is connected an operative plate $m3$ which is provided with intake openings $m4$ and a central hub $m5$ to which is rotatably mounted the operative gate $m6$ to which is secured the dual operating arm $m7$ to which are connected one end of the rods $m8$ which are connected at the other end thereof to a rocker plate $m9$ which are pivotably supported by bearings $m10$ which are connected to the front cylinder housing $A1$.

As shown in Figure 11, a tubular extension $m11$ is suitably provided on one of the rocker plates $m9$ and is supported on the bearings $m12$ and $m13$ which are secured respectively to the front cylinder housing A1 and the rear cylinder housing A4.

A lever arm $m14$ is suitably secured to the tubular extension $m11$ by the collar $m15$ and provides means for manual operation through the link connection $m16$.

An arm L16 secured to the control gate ring L15 has pivotably connected thereto one end of a connecting rod L17 the other end of which is pivotably connected to an arm L18 which is secured to one end of a shaft L19 which extends through the tubular extension $m11$ and has secured to the other end thereof the lever arm L20 which provides means for manual operation through the link connection L21.

As is shown in detail in Figure 5, an exhaust pipe P is suitably secured to exhaust outlets $p1$ by means of the bolts $p2$. The camshaft tubes J are suitably connected to the cylinders 1 to 16 by means of a lug $j19$ which is formed on said camshaft tubes J and the bolts $j20$ which connect said lug $j19$ to said cylinders.

Figures 3, 12, 13:
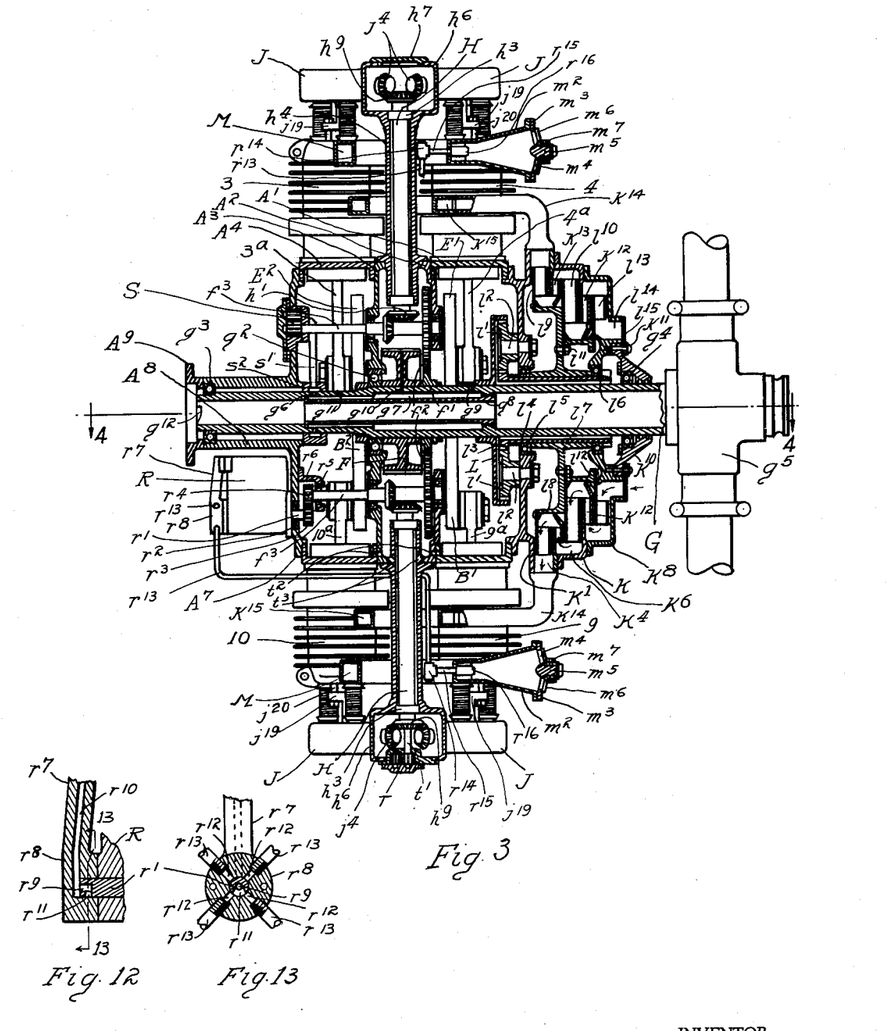
Fig. 3 shows a longitudinal section thereof taken on line 3—3 of Figure 1.
Fig. 12 shows a detail of a fuel oil distributing device.
Fig. 13 shows a section on line 13—13 of Figure 12.

As is shown in Figure 3 and Figure 12 a fuel pump R is suitably connected to the rear housing plate A7 which is connected to the rear cylinder housing A4.

The fuel pump R is provided with a drive shaft $r1$ which is rotatably mounted in the bearing $r2$ and is provided with a pinion $r3$ which is adapted to mesh with a gear $r4$ which is suitably connected to a shaft $f3$ and is rotated thereby.

The shaft $f3$ is rotatably mounted in the bearing $r5$ which is mounted in the bearing support $r6$ which is secured to the rear plate A7.

A fuel delivery tube $r7$ is suitably secured to the fuel pump R and terminates into a fuel distributor $r8$ into which the drive shaft $r1$ extends.

A hole $r9$ is provided in the end of the drive shaft $r1$ and connects with the fuel passage $r10$ in the fuel delivery tube $r7$ and terminates in an outlet port $r11$ which registers with a plurality of outlet passages $r12$ to which are secured the delivery pipes $r13$ which extend into proximity of the air intake chamber M and terminates into a resistor valve $r14$ from which a pipe $r15$ extends into the air intake chamber M and terminates into a suitable fuel spray nozzle $r16$.

Means are thus provided for spraying fuel in timed relation against and into air entering into the entrance nozzle $m2$ and through the air intake chamber M into air inlet passages of the cylinders connected thereto.

As the cylinders 1 to 16 have their crank pins spaced 45 degrees apart consecutively and as the usual intake period extends over a period of approximately 210 degrees crank rotation it follows that in each group of four cylinders the intake period extends over approximately 345 degrees crank rotation in which at the midpoint of said intake period all intake valves are partly opened.

It is obvious then that a gradual acceleration of air velocity occurs in the intake nozzle $m2$ up to midpoint of the intake period and then a gradual deceleration until the last of the four intake valves closes.

Into this incoming air stream, fuel is injected through the fuel spray nozzle $r16$ with relative volume proportions thus insuring a correct and uniform mixture for all cylinders.

A lubrication oil pump S is suitably secured to the rear housing plate A7 and is adapted to be operated by a shaft $f3$.

An oil delivery pipe $s1$ connects said pump S with an oil collar $s2$ which surrounds the propeller shaft G near the rear housing plate A7 and is adapted to feed oil through holes $g6$ in said propeller shaft G into an oil supply compartment $g7$ which is formed by the inner tube $g8$ which is secured into the propeller shaft G.

Oil spray holes $g9$, $g10$ and $g11$ provide suitable means for supplying all working parts with a constant bath of oil and a scavenging pump T located in the lower gear chamber $h6$ and suitably secured thereto and operated by an extension shaft $t1$ connected to the shaft H provides means for removing accumulated oil from the interior parts of the engine.

Suitable oil passages $t2$ in the lowest portion of the housing A permits oil to flow to the tube $h4$ and through holes $t3$ in said tube $h4$ down to the scavenging pump T.

A tubular extension A8 on the rear plate A7 surrounds the propeller shaft G and supports the rear bearing $g3$ and has secured thereto a starter flange A9 to which any suitable starter may be attached and which may engage with the starting clutch $g12$ which is suitably provided on the rear end of the propeller shaft G.

Suitable ignition devices may be provided and operated by shafts $j3$ to provide ignition current to the spark plugs $j21$ which are secured in the openings $j22$ of each cylinder.

Figure 4:
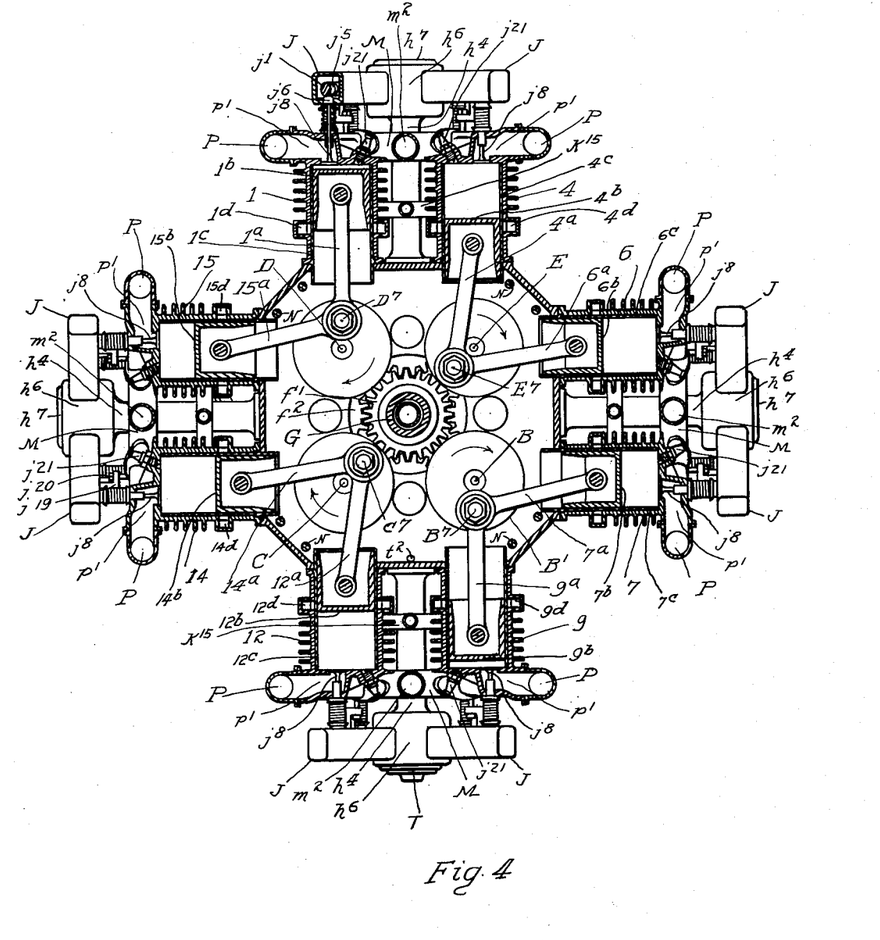
Fig. 4 shows a sectional view on line 4—4 of Figure 3.

As is shown in Figure 4 the piston $1b$ in the cylinder 1 is shown at the termination point of the compression stroke and at the point of firing the charge in cylinder 1 and is adapted to rotate the crankshaft D in the direction shown by the arrow thereon.

The concurrent position of the crank pin for operating the piston in cylinder 2 on said crankshaft D is shown in Figure 2 showing a lag in rotative position of 45 degrees with respect to the crank pin for operating the piston in cylinder 1.

A further lag in rotative position of 45 degrees is shown successively between cylinder 2 and cylinder 3 and 3 and 4 in the top group of cylinders and similar relation is obtained in the rotative relation between all successive cylinders 5 to 16 and from cylinders 16 to 1.

A firing order is thus arrived at in which the cylinders in each group of four cylinders can be successively fired thereby permitting the forming a gas and air mixture for successive intake into the cylinders of said group.

In this method of forming a fuel mixture notice is taken of the fact that in all ordinary types of multi-cylinder engines a charge of air and gas mixture is suddenly accelerated into the intake of a cylinder and then comes to a complete stop in the manifold at the close of the intake stroke, the air and gas mixture must then accelerate to another cylinder some distance removed from the first named cylinder, the pulsation thus caused in the manifold of such engines has a tendency to disturb the uniformity of the air and gas mixture supplied and also increases the resistance to the flow of said mixture causing a lower terminal pressure and efficiency in said cylinders.

In this invention the applicant has provided a progressive acceleration of a gas mixture during a greatly lengthened intake cycle where four intake valves are concurrently open at the midpoint of said intake cycle permitting the development of a combined charge of air and gas mixture for the four cylinders thus insuring a progressive acceleration and deceleration of flow of said air and gas mixture over a relatively longer period of time and thereby reducing the resistance of flow to a minimum.

A further advantage is obtained in this method of forming a charge of air and gas mixture in that the metering of the necessary supply of fuel can be accomplished in a more accurate manner in the lengthened period of time and the increased quantity required for four cylinders. As the volume relations between the air used and fuel required approximates a ratio of about 8000 to 1, it is evident that when the engine has to be idled which requires about ⅕ of the power required of full load operation for the identical speed, it becomes a more difficult problem to make this division for one cylinder than for four cylinders at one time.

It is thus possible to simplify the method of forming air and gas mixture and permits forming in close proximity to the heated cylinders where the increased temperatures aid in vaporizing liquid fuel.

Other advantages accrue in this method of providing an intake mixture in that the velocity pressure of the air flowing from the propeller can be directly used to gain terminal pressure in the intake of the cylinders and with the concurrent heat absorption from the cylinders the latent heat required for vaporization of the fuel can be accomplished and utilized to increase the efficiency of combustion within the cylinder.

In order to still further increase terminal pressures of the intake into the cylinders or to augment same in higher altitudes the multi-stage supercharger is provided and which is operated at increased rotative speed relative to the speed of the propeller shaft G by which the impellers thereof are rotated.

By rotating the control gate ring L15 so that air may flow into the inlet ports L14 air will flow as shown by the arrows in Figure 3 through the three stage impeller into the final stage housing K4 and through the outlet pipes K5 into the pipe K14 and from there to the supply ring K15.

When through the rotation of the camshafts j1, the cam j13 depresses the plug j14 and the attached rod j17 and valve K16, air will flow from the supply ring K15 into the chamber d surrounding each cylinder and through the ports e and opening f into the cylinder displacement space g thus augmenting the pressure therein. As the valve K16 is opened for the passage of air only at the termination of the intake stroke the terminal pressure of the intake charge is thereby increased depending on the amount of air permitted to pass through the inlet ports L14 by the respective position of the openings L23 of the control gate ring L15.

It is obvious that by supplying fuel under pressure to the fuel spray nozzle r16 that fuel will flow therethrough relative in quantity to the pressure applied to said fuel, therefore, by applying a pressure control either manually or by automatic means to the fuel supply system, that the amount of fuel supplied to each incoming air charge can be regulated to secure the desired richness of air and fuel mixture.

The fuel distributor shown in Figure 12 and Figure 13 shows an effective means of timing the supply of fuel to each group of four cylinders in which fuel will flow through each of the fuel supply pipes r13 to the nozzle r16 in timed relation to the intake period in the respective group of four cylinders.

Having thus described my invention and its mode of operating, what I claim and desire to secure by Letters Patent is:

1. In an internal combustion engine, a plurality of crank shafts, a plurality of internal combustion engine units for rotating each of said crank shafts, each of said crank shafts being suitably mounted adjacent to a central drive shaft and adapted to rotate same through suitable gearing, half of each group of internal combustion engine units connected to a crankshaft forming a secondary group with another half group connected to a second crankshaft, said secondary group of internal combustion engine units provided with suitable valve operating means and valves so arranged as to permit periodic formation of a gas and air mixture for said secondary group of internal combustion engine units, and to admit said air and gas mixture successively into the cylinders of said secondary group of internal engine units.

2. In an internal combustion engine, a multi-cylinder engine arranged in primary groups of four individual engine units adapted to rotate a crankshaft, half of each of said four engine units paired with the half of another group to form a secondary group of four individual engine units, said secondary group of engine units provided with a valve operating mechanism, each engine unit provided with suitably arranged valves, said valve operating mechanism adapted to operate said valves in timed relation to the rotation of said crankshafts and successively for each cylinder of said secondary group.

3. In an internal combustion aircraft engine, a multi-cylinder engine comprising groups of individual engine units extending outwardly from and adapted to rotate a central shaft, each of said groups provided with an individual valve operating mechanism actuated by said central shaft, said valve operating mechanism arranged to perform each cyclical operation successively in series on said group of cylinders, an air intake chamber connected to said group of cylinders provided with means for controlling the volume of air passing therethrough and with means of mixing a regulated supply of fuel with said air within said intake chamber.

4. In an internal combustion aircraft engine, a multi-cylinder engine arranged in groups of individual engine units extending outwardly from and adapted to rotate a central shaft, each of said groups provided with an individual valve operating mechanism actuated by said central shaft, said valve operating mechanism arranged to perform each cyclical operation successively in series on said group of cylinders, an air intake chamber connected to said group of cylinders, said air intake chamber provided with means of controlling the volume of air passing therethrough and with means of mixing a regulated quantity of fuel with said air, means for supplying fuel to said air intake chamber, means for controlling the volume thereof, and auxiliary means for supplying air to each of said cylinders as a means for supercharging same.

5. In an internal combustion aircraft engine having groups of radially extending engine units adapted to rotate a central drive shaft, each of said groups of engine units provided with a valve operating mechanism actuated by said central drive shaft, said group of engine units provided with an air intake chamber suitably secured to each of the cylinders of said group, an intake valve interposed between said air intake chamber and said cylinder, a camshaft adapted to operate said valve comprising part of said valve operating mechanism, said cylinders provided with a circular chamber extending around said cylinder, a suitable liner provided in said cylinder, openings from said circular chamber extending to said liner, openings in said liner contacting the aforesaid openings and extending to the cylinder displacement space at a point when the piston is near the end of the intake stroke, a supercharger air supply ring secured to said circular chamber, a valve suitably located in said supercharger air supply ring opening into said circular chamber, a cam on said camshaft adapted to operate said valve in timed relation to the operation of said intake valve, means for supplying air under pressure to said supercharger air supply ring and means for controlling the pressure of said air supply.

6. In an internal combustion aircraft engine, plural groups of engine units adapted to rotate crankshafts parallel to a central drive shaft, said crankshafts geared to said central drive shaft, each group of engine units provided with a valve operating mechanism actuated by said central drive shaft, means for periodically forming an air and gas mixture for each group independently and in series from group to group.

7. In an internal combustion engine, a plurality of groups of engine units extending radially from a central shaft and adapted to rotate a plurality of crankshafts, said crankshafts geared to a central propeller shaft, a central propeller shaft adapted to rotate gearing adapted to operate a plurality of valve mechanism, said central propeller shaft adapted to rotate an impeller of a supercharger surrounding said central propeller shaft and supported in bearings free from said central propeller shaft and adapted to rotate in reverse direction to the rotation of said central propeller shaft.

8. In an internal combustion aircraft engine, a central propeller shaft adapted to be rotated by means of gearing from a plurality of crankshafts, each crankshaft adapted to be rotated by energy formed in a plurality of internal combustion cylinders, said cylinders arranged in groups extending radially from said central propeller shaft, a plurality of valve operating mechanisms adapted to be actuated by suitable gearing from said central propeller shaft, said valve operating mechanism adapted to actuate valves on said cylinders in timed relation to the firing order of said cylinders successively from cylinder to cylinder in each group and similarly from group to group.

9. In an internal combustion aircraft engine, plural groups of engine units provided with a valve mechanism adapted to operate the valves of each engine cylinder successively in each group and successively from group to group, means for supercharging the intake of fuel mixtures in said cylinders after the termination of the intake stroke, valve means actuated by said valve mechanism adapted to admit supercharging air to said cylinder after the termination of the intake stroke.

10. In an internal combustion engine, a plurality of cylinders forming a primary group of power units adapted to rotate a crankshaft, a plurality of said primary groups forming means to rotate a propeller shaft through suitable gearing, a supercharger housing secured to the body of said engine and having mounted therein an impeller adapted to rotate in opposite direction to the rotation of said propeller shaft, said impeller mounted in bearings supported by the supercharger housing and free of contact to said propeller shaft.

11. In an internal combustion engine, a multistage supercharger housing secured to the body of said engine comprising an end plate provided with suitable means for supporting a plurality of intermediate gears, rotatably mounted thereon, an internal gear secured to a propeller shaft extending centrally through said supercharger housing adapted to rotate said intermediate gears, a gear ring formed on an impeller tube adapted to mesh with said intermediate gears and adapted to be rotated thereby in reverse direction to the rotation of said propeller shaft, said impeller tube suitably mounted in bearings exterior to said impeller tube, said bearings supported by said supercharging housing, a multi-stage impeller secured to said impeller tube and adapted to rotate within multi-stage chambers formed on said supercharger housing and adapted to move air into and through suitable passages formed in said supercharger housing into suitable delivery pipes connected to said supercharger, and control means adapted to control the amount of air passing through said supercharger housing.

12. In an internal combustion aircraft engine, plural groups of co-acting engine units adapted to rotate plural crankshafts, said crankshafts adapted to rotate through suitable gearing a central propeller shaft, said central propeller shaft provided with a gear adapted to rotate a plurality of valve operating mechanisms, each valve operating mechanism adapted to operate valves on cylinders comprising a group of co-acting engine units, said group of co-acting engine units provided with an intake manifold connected to each cylinder of said group and provided with a fuel injection device adapted to provide an air and fuel mixture in timed relation with the intake period of said group of co-acting engine units.

13. In an internal combustion aircraft engine, plural groups of co-acting engine units, each group provided with an intake manifold connected to the cylinders thereof, valve operating means adapted to operate intake valves successively from cylinder to cylinder in said group and adapted to form a unit intake period for all cylinders of said group, periodically timed fuel delivery means connected to said intake manifold adapted to supply fuel through a suitable spray nozzle in timed relation to the intake of air to said group of cylinders, air intake control means on said intake manifold adapted to control the volume of the air intake to said group of cylinders, said air intake control means interconnected with other similar air intake control means, and manual means for operating said air intake control means.

HARDING FERRIS BAKEWELL.